United States Patent
Garg et al.

(10) Patent No.: US 11,176,271 B1
(45) Date of Patent: Nov. 16, 2021

(54) SYSTEM, METHOD, AND COMPUTER PROGRAM FOR ENABLING A CANDIDATE TO ANONYMOUSLY APPLY FOR A JOB

(71) Applicant: Eightfold AI Inc., Mountain View, CA (US)

(72) Inventors: Ashutosh Garg, Sunnyvale, CA (US); Varun Kacholia, Sunnyvale, CA (US)

(73) Assignee: EIGHTFOLD AI INC., Mountain View, CA (US)

( * ) Notice: Subject to any disclaimer, the term of this patent is extended or adjusted under 35 U.S.C. 154(b) by 218 days.

(21) Appl. No.: 16/209,847

(22) Filed: Dec. 4, 2018

(51) Int. Cl.
*G06F 21/62* (2013.01)
*H04L 29/08* (2006.01)
*G06Q 10/10* (2012.01)

(52) U.S. Cl.
CPC ...... *G06F 21/6254* (2013.01); *G06F 21/6272* (2013.01); *G06Q 10/1053* (2013.01); *H04L 67/306* (2013.01)

(58) Field of Classification Search
CPC ............. G06F 21/6254; G06F 21/6272; H04L 67/306; G06Q 10/1053
See application file for complete search history.

(56) References Cited

U.S. PATENT DOCUMENTS

| | | | |
|---|---|---|---|
| 7,472,097 B1* | 12/2008 | Scarborough | G06Q 10/06 706/26 |
| 9,665,641 B1 | 5/2017 | Zhang | |
| 10,185,712 B2 | 1/2019 | Gidney | |
| 2005/0004905 A1* | 1/2005 | Dresden | G06F 16/951 |
| 2005/0086186 A1* | 4/2005 | Sullivan | G06N 3/0454 706/16 |
| 2005/0216295 A1* | 9/2005 | Abrahamsohn | G06Q 30/02 705/321 |
| 2005/0261956 A1* | 11/2005 | Kato | G06Q 10/00 705/321 |
| 2006/0235884 A1 | 10/2006 | Pfenniger et al. | |
| 2006/0271421 A1 | 11/2006 | Steneker et al. | |

(Continued)

OTHER PUBLICATIONS

IP.com Search Query Sep. 4, 2020 (Year: 2020).*

(Continued)

*Primary Examiner* — Samson B Lemma
*Assistant Examiner* — Blake I Narramore
(74) *Attorney, Agent, or Firm* — Zhong Law, LLC

(57) ABSTRACT

A system and computer program enable a candidate to anonymously apply for a job position at an organization. In response to submitting a resume or other data for the purpose of applying anonymously for a job, the system generates an anonymous profile for the candidate and provides it to the organization to which the candidate is applying. The system excludes the candidate's name from the anonymous profile. In certain embodiments, the system also excludes one or more of the following: the candidate's address, data that is indicative of a candidate's race, age, or gender, and data that is not relevant for the job role for which the candidate is applying. After reviewing the anonymous profile, the organization has the option to reject the candidate or explore the candidate further. In response to the organization rejecting the candidate, the system notifies the candidate of the rejection without revealing the candidate's identity to the organization.

18 Claims, 11 Drawing Sheets

(56) References Cited

U.S. PATENT DOCUMENTS

| | | | |
|---|---|---|---|
| 2007/0022170 A1* | 1/2007 | Foulger | G06Q 10/107 |
| | | | 709/206 |
| 2007/0033064 A1* | 2/2007 | Abrahamsohn | G06Q 30/02 |
| | | | 705/321 |
| 2007/0047802 A1* | 3/2007 | Puri | G06N 3/084 |
| | | | 382/157 |
| 2007/0112585 A1 | 5/2007 | Breiter et al. | |
| 2009/0144075 A1 | 6/2009 | Flinn et al. | |
| 2010/0153149 A1 | 6/2010 | Prigge et al. | |
| 2010/0153150 A1 | 6/2010 | Prigge et al. | |
| 2011/0055098 A1 | 3/2011 | Stewart | |
| 2011/0276505 A1 | 11/2011 | Schmitt | |
| 2011/0276507 A1* | 11/2011 | O'Malley | G06Q 30/00 |
| | | | 705/321 |
| 2013/0096991 A1 | 4/2013 | Gardner et al. | |
| 2013/0290208 A1* | 10/2013 | Bonmassar | G06Q 50/01 |
| | | | 705/321 |
| 2014/0039991 A1 | 2/2014 | Gates et al. | |
| 2014/0040929 A1* | 2/2014 | Mears | H04H 60/31 |
| | | | 725/10 |
| 2014/0052648 A1* | 2/2014 | Pointer | G06Q 50/184 |
| | | | 705/310 |
| 2014/0122355 A1 | 5/2014 | Hardtke et al. | |
| 2014/0282586 A1 | 9/2014 | Shear et al. | |
| 2014/0330734 A1 | 11/2014 | Sung et al. | |
| 2015/0142711 A1 | 5/2015 | Pinckney et al. | |
| 2015/0161567 A1 | 6/2015 | Mondal et al. | |
| 2015/0178682 A1* | 6/2015 | Matthews | G06Q 10/1053 |
| | | | 705/321 |
| 2015/0244850 A1 | 8/2015 | Rodriguez et al. | |
| 2015/0309986 A1 | 10/2015 | Brav et al. | |
| 2015/0317610 A1 | 11/2015 | Rao et al. | |
| 2016/0012395 A1* | 1/2016 | Omar | G06Q 10/105 |
| | | | 705/320 |
| 2016/0034463 A1* | 2/2016 | Brewer | H04L 43/12 |
| | | | 707/734 |
| 2016/0034853 A1* | 2/2016 | Wang | G06F 16/24578 |
| | | | 705/321 |
| 2016/0055457 A1 | 2/2016 | Mather et al. | |
| 2016/0098686 A1 | 4/2016 | Younger | |
| 2017/0061081 A1* | 3/2017 | Jagannathan | G06F 16/285 |
| 2017/0243162 A1* | 8/2017 | Gavrielides | G06F 16/273 |
| 2017/0344555 A1 | 11/2017 | Yan et al. | |
| 2017/0357945 A1 | 12/2017 | Ashkenazi et al. | |
| 2018/0039946 A1 | 2/2018 | Bolte et al. | |
| 2018/0150484 A1 | 5/2018 | Dupey et al. | |
| 2018/0218330 A1 | 8/2018 | Choudhary et al. | |
| 2018/0232751 A1* | 8/2018 | Terhark | G06Q 10/063118 |
| 2018/0308061 A1 | 10/2018 | Jadda et al. | |
| 2018/0336501 A1* | 11/2018 | Le | G06Q 10/1053 |
| 2018/0357557 A1 | 12/2018 | Williams et al. | |
| 2018/0373691 A1 | 12/2018 | Alba et al. | |
| 2019/0066056 A1 | 2/2019 | Gomez et al. | |
| 2019/0114593 A1 | 4/2019 | Champaneria | |
| 2019/0197487 A1 | 6/2019 | Jersin et al. | |
| 2019/0205838 A1 | 7/2019 | Fang et al. | |
| 2020/0007336 A1 | 1/2020 | Wengel | |
| 2020/0065769 A1 | 2/2020 | Gupta et al. | |
| 2020/0117582 A1* | 4/2020 | Srivastava | G06F 11/3688 |
| 2020/0160050 A1* | 5/2020 | Bhotika | G06K 9/00463 |
| 2020/0233910 A1 | 7/2020 | Bhide et al. | |

OTHER PUBLICATIONS

Hardt et al. "Equality of Opportunity in Supervised Learning," arXiv:1610.02413v1, Oct. 7, 2016, 22 pages.

Liu et al., "Delayed Impact of Fair Machine Learning," arXiv:1803.04383v2, Apr. 7, 2018, 37 pages.

Dixon et al., "Measuring and Mitigating Unintended Bias in Text Classification," Proceeding of the 2018 AAAI/ACM Conf. on AI, Ethics, and Society, Feb. 2-3, 2018, 7 pages.

Pedreschi et al., "Discrimination-Aware Data Mining," Aug. 24-27, 2008, KDD 08, Las Vegas, Nevada, 9 pages.

International Application No. PCT/US2020/012317, International Search Report and Written Opinion dated Apr. 9, 2020, 8 pages.

CustomerGlu "Hire the best candidate for your Company using Artificial Intelligence" (2016), medium.com/SCustomerGlu, 2016, 5 pages.

Barbara Depompa, "Time for a Diversity 'Reboot'", SC Magazine 29:4: 26-29, 2018, Haymarket Media, Inc., pp. 1-4.

Elejalde-Ruiz, What Resume? Hiring is in the Midst of a Tech Revolution; Cutting Costs, Turnover; Eliminating Bias, South Florida Sun—Sentinel, 2018, pp. 1-3.

Sarah K. White, 4 Ways Technology has Changed Recruitment—For Better (and Worse), CIO CXO Media, Inc., 2017, pp. 1-3.

Sarah Dobson, "Feds Try to Blank Out Bias", Canadian HR Reporter 30, 9, HAB Press Limited, 2017, pp. 1-3.

David Hausman, "How Congress Could Reduce Job Discrimination by Promoting Anonymous Hiring", Stanford Law Review 64.5, 2012, pp. 1343-1369, Stanford University, Stanford Law School.

* cited by examiner

ENABLING A CANDIDATE TO ANONYMOUSLY APPLY FOR A JOB AT AN ORGANIZATION

Provide a candidate with an option to anonymously apply for a job position at an organization (*e.g.*, user clicks on button to apply anonymously and submits resume)
110

↓

Receive candidate data from a candidate (*e.g.*, receive a resume)
120

↓

Create non-anonymous candidate profile based on the candidate data (*e.g.*, creating an enriched talent profile)
130

↓

Create an anonymous profile by "anonymizing" the candidate data in the non-anonymous profile
140

↓

Display the anonymous profile in a user interface for the organization
150

↓

Provide the organization with the option to reject the candidate or explore the candidate further
160

↓

In response to the organization rejecting or passing on the candidate, notifying the candidate accordingly. Neither the identity nor the non-anonymous profile of the candidate is revealed to the organization.
170

↓

In response to the organization electing to explore the candidate further, enabling the organization to contact the candidate and/or to see the full candidate profile at the present time or at a future time.
180

FIG. 1

EXAMPLE METHOD FOR DETERMINING WHETHER A KEY-VALUE PAIR IS INDICATIVE OR PREDICTIVE OF A PARTICULAR CLASS VALUE

For each of a plurality of key-value pairs and combinations of key-value pairs in the non-anonymous profiles of candidates in a training set, maintain a count of the number of times the key-value pair or the combination (whichever is applicable) appears for each of the class values
410

For each of the plurality of key-value pairs and combinations of key-value pairs, determine whether the key-value pair or the combination is associated with a particular class value for more than a threshold percentage of candidates in the training set
420

In response to a key value pair or a combination of key-value pairs being associated with a particular class value for more than a threshold percentage (e.g., 80%) of the training candidates, conclude that the key-value pair or the combination is indicative of the class value and, thus, may influence bias with respect to the defined class.
430

FIG. 4

**EXAMPLE OF METHOD FOR IDENTIFYING KEY-VALUE PAIRS THAT MAY INFLUENCE AGE BIAS
(Using Threshold Method)**

Classify each candidate within a training set with an age range using one or more school graduation dates
810

For each a plurality of the key-value pairs and the combinations of key-value pairs in the training candidates' non-anonymous profiles, maintain a count of the number of times the key-value pair or combination (whichever is applicable) appears for each of the age ranges
820

For each of the key-value pairs and the combinations of key-value pairs, determine if the key-value pair is associated with a particular age range for more than a threshold percentage of the training candidates
830

In response to a key-value pair or a combination of key-value pairs being associated with a particular age range for more than a threshold percentage of the training candidates, conclude that key-value pair or the combination of key-value pairs may influence age bias
840

FIG. 8

SYSTEM, METHOD, AND COMPUTER PROGRAM FOR ENABLING A CANDIDATE TO ANONYMOUSLY APPLY FOR A JOB

BACKGROUND OF THE INVENTION

1. Field of the Invention

This invention relates generally to human resource applications, and more specifically to enabling a candidate to apply anonymously for a job.

2. Description of the Background Art

People are sometimes hesitant to apply for new jobs out of concern that their current employer may find out. For many people, the risk is worth taking only if there is a decent chance that they will get the job. To encourage people to apply, it would be helpful if applicants could apply anonymously and only have their identities revealed after the hiring organization has reviewed their resume and decided it is interested in speaking with them further. Therefore, there is a need for a system that facilitates anonymous job applications.

SUMMARY OF THE DISCLOSURE

The present disclosure describes a system, method, and computer program for enabling a candidate to anonymously apply for a job position at an organization. The method is performed by a computer system ("the system").

The system enables a candidate to submit candidate data to the system for the purpose of applying anonymously for a particular job at a particular organization. In response to receiving the candidate data, the system generates a non-anonymous profile for the candidate. For example, the system may generate a talent profile or an enhanced talent profile, as described in U.S. patent application Ser. No. 16/121,401, filed on Sep. 4, 2018, and titled "System, Method, and Computer Program for Automatically Predicting the Job Candidates Most Likely to be Hired and Successful in a Job," the contents of which are incorporated by reference herein.

The system then generates an anonymous profile for the candidate from the non-anonymous profile. In certain embodiments, the anonymous profile is identical to the non-anonymous profile, but excludes the candidate's name. In other embodiments, the non-anonymous profile may also exclude the following:
  The candidate's address;
  Data that is indicative of the candidate's gender, race, and/or age (or data that may influence another defined class of bias); and/or
  Data that is not relevant to the job position for which the candidate is applying. As described in more detail below, this may involve abstracting the candidate's data to relevant levels for the particular job position for which the candidate is applying.

The system provides the anonymous profile to the organization to which the candidate is applying and enables the organization to reject the candidate or explore the candidate further. In response to the organization electing to reject the candidate, the system notifies the candidate of the decision without revealing the candidate's identity or non-anonymous profile to the organization.

In response to the organization electing to explore the candidate further, the enables the organization to contact the candidate and/or view the non-anonymous profile at a current or later time.

In one embodiment, a method for enabling a candidate to anonymously apply for a job at an organization comprising the following:
  receiving an indication of a candidate's election to anonymously apply for the job position;
  receiving candidate data for the candidate;
  creating a non-anonymous candidate profile for the candidate based on the candidate data;
  creating an anonymous profile for the candidate by removing or substituting data in the non-anonymous candidate profile, including excluding the candidate's name from the anonymous profile;
  displaying the anonymous profile in a user interface for the organization;
  providing the organization with an option to reject the candidate or explore the candidate further; and
  in response to the organization rejecting the candidate, notifying the candidate of the rejection without revealing the non-anonymous candidate profile or the identity of the candidate to the organization.

BRIEF DESCRIPTION OF THE DRAWINGS

FIG. 1 is a flowchart that illustrates a method for enabling a candidate to apply anonymously for a job at an organization according to one embodiment.

FIG. 4 is a flowchart illustrates a method, according to one embodiment, for determining whether a key-value pair is indicative of a particular class value.

FIG. 8 is a flowchart that illustrates an example method for identifying key-value pairs that may influence age bias.

DETAILED DESCRIPTION OF THE PREFERRED EMBODIMENTS

Figure 2:
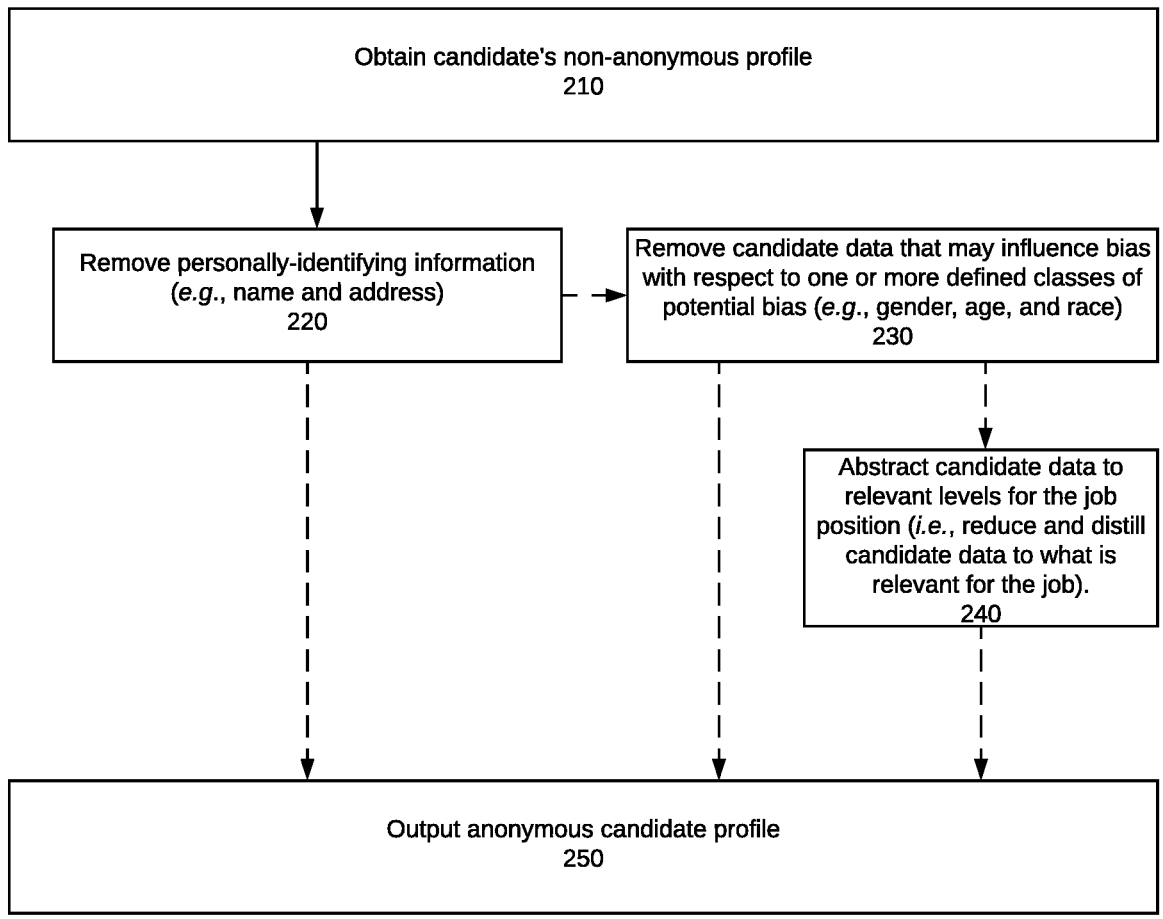
FIG. 2 is a flowchart that illustrates a method for creating an anonymous profile for a candidate according to one embodiment.

1. Enabling a Candidate to Apply Anonymously for a Job

FIG. 1 illustrates a method for enabling a candidate to apply anonymously for a job at an organization (e.g., a company). The method is performed by a computer system. The system may be a computer system that identifies potential candidates for open job positions and that displays profiles for the identified candidates. An example of the system is described in U.S. patent application Ser. No. 16/121,401 (incorporated herein above).

On a website or in a mobile application that displays open job postings, the system provides a candidate with an option to apply anonymously for a posted job position (step 110). For example, there may be an "apply anonymously" button on an organization's website or in a job-search mobile application. In certain embodiments, selecting the button navigates the candidate to a user interface provided by the system, where the candidate is able to upload his/her candidate data to the system. Candidate data is the candidate's education and work experiences and may also include other information, such as a candidate's hobbies and interests. It is the type of data typically found in a resume. The candidate data may be in the form of a resume submitted by the candidate or professional profile data entered into a user interface of the system.

The system receives candidate data submitted by a candidate for an anonymous application for a particular job (step 120). The candidate data may be provided to the system directly by the candidate or through a third-party intermediary, such as a server for a career or job search website. The data received by the system also include the identity of the organization to which the candidate is applying.

The system creates a non-anonymous candidate profile for the candidate based on the candidate data (step 130). The non-anonymous candidate profile may be a talent profile or an enhanced talent profile, as described in U.S. patent application Ser. No. 16/121,401 (incorporated herein above).

The system then creates an anonymous profile for the candidate by automatically "anonymizing" the candidate data in the non-anonymous profile (step 140). Methods for "anonymizing" candidate data are described with respect to FIGS. 2-11 below. In certain embodiments, the system may enable the candidate to approve the anonymous profile before sending it to the organization to which the candidate is applying.

The system enables the organization to which the candidate is applying to view the anonymous profile (step 150). For example, the system may generate a user interface with a ranked list of prospective candidates for the job and enable a user at the organization to view the anonymous profile through this user interface. For example, when a user "clicks" on a candidate in the list, the user will see an anonymous profile if the candidate applied anonymously.

The system provides the organization with the option to reject the candidate or explore the candidate further (step 160). For example, there may be buttons akin to "reject" and "explore further" in the user interface in which the anonymous profile is displayed.

In response to the organization rejecting the candidate, the system notifies the candidate of the rejection (step 170). Neither the identity nor the non-anonymous profile of the candidate is revealed to the organization. In other words, the rejected candidate remains anonymous to the organization.

In response to the organization electing to explore the candidate further, the system enables the organization to contact the candidate and/or to see the non-anonymous profile at the present time or a future time (step 180). For example, in response to the organization electing to explore the candidate further, the system may provide the organization with a name, email and/or phone number for candidate to enable the organization to schedule an interview or phone screen with the candidate. Alternatively, the system may notify the candidate that the organization wishes to speak with the candidate (or otherwise explore the candidate further) and obtain the candidate's permission to provide contact information or the candidate's non-anonymous profile to the organization. Whether the non-anonymous profile is displayed to the organization immediately upon the decision to explore the candidate further or at a later point is dependent on the configurations set by the organization or a system administrator of the system.

2. Creating an Anonymous Profile for a Candidate

FIG. 2 illustrates a method for creating an anonymous profile for a candidate. The system starts with a candidate's non-anonymous profile (step 210), as the anonymous profile will be based on the non-anonymous profile but will exclude or substitute certain information that is in the non-anonymous profile. In generating the anonymous profile, the system removes information in the non-anonymous profile that personally identifies the candidate (step 220). In certain embodiments, this amounts to excluding the candidate's name from the anonymous profile. In other embodiments, the system also excludes the candidate's street address from the anonymous profile. "Removing" or "excluding" data from an anonymous profile may mean removing data that is initially in a non-final anonymous profile or excluding it to begin with in generating the anonymous profile.

In some cases, the system outputs the anonymous profile after step 220. However, in other cases, the system performs steps 230 and/or 240 in creating the anonymous profile. Steps 230 and 240 involve identifying candidate data in the non-anonymous profile that may influence bias by a reviewer at an organization, and then removing or substituting such data in the anonymous profile.

In step 230, the system removes candidate data that may influence bias with respect to a defined class of bias. For example, the system may remove data that is indicative of the candidate's gender, race, and/or age from the anonymous profile. Methods for performing step 230 are described in more detail below with respect to FIGS. 3-8.

In step 240, the system removes from the anonymous profile any data that is not relevant to the job for which the candidate is applying. As described in more detail with respect to FIGS. 9-11, this includes identifying what candidate data in the non-anonymous profile is relevant for the particular job, and, for relevant candidate data, at what level the data is relevant (at the base level or at an abstracted level).

Figure 3:
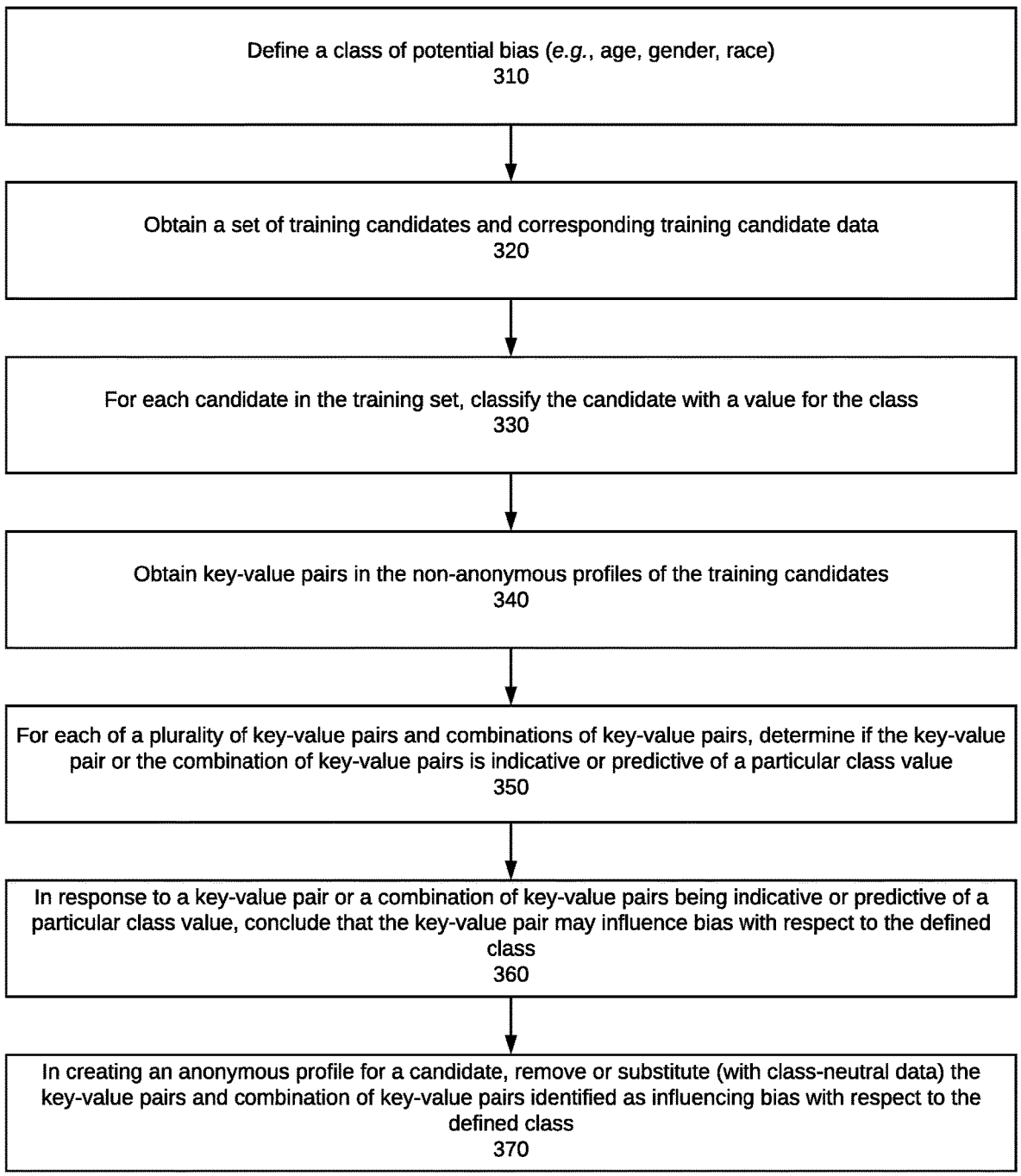
FIG. 3 is a flowchart that illustrates a method, according to one embodiment, for identifying candidate data that may influence bias with respect to a defined class of bias.

3. Identifying Data that May Influence Bias with Respect to a Defined Class of Bias As indicated above, FIGS. 3-8 describe methods for performing step 230 in FIG. 2. FIG. 3 illustrates a method for identifying data in non-anonymous profiles that may influence bias with respect to a defined class of bias. The system receives as an input a defined class of bias, such as race, gender, and age (step 310). The defined class may be inputted by a system administrator or a user of the system (e.g., an HR manager at the hiring organization) via a user interface.

The system obtains candidate data for set of training candidates, preferably from across a plurality of organizations and a variety of professions (step 320). The training candidate data includes their non-anonymous profiles (e.g., a resume, talent profile, or enhanced talent profile) and data that enables each of the candidates to be classified with a class value (e.g., name or school graduation date). The system may obtain the training candidate data from a talent repository managed by the system (or an organization/company) or from public data sources that store job-candidate/employment profiles. The system classifies each of the training candidates with a class value (e.g., male or female) (step 330).

The system obtains key-value pairs from the non-anonymous profiles of the training candidates (step 340), and for each of a plurality of key-values pairs and combinations of key-value pairs, the system determines if the key-value pair or combination of key-value pairs is indicative of a particular class value (step 350). In response to a key-value pair or a combination of key-value pairs being indicative of a particular class value, the system concludes that the key-value pair or combination of key-value pairs may influence bias with respect to the defined class (step 360). In creating an anonymous profile for a candidate, the system removes or substitutes (with class-neutral data) the key-value pairs and combination of key-value pairs identified as influencing bias with respect to the defined class (step 370). For example, the system may remove key-value pairs from the anonymous profile that are indicative of race, gender, and/or age. "Neutral" data that serves as a substitute for key-value pairs may be an abstracted form of the key-value pair. For example, a particular US college may be replaced with an abstracted value of the college, such as "4-year US college."

3.1 Determining whether a Key-Value Pair is Indicative of a Particular Class Value FIG. 4 illustrates a method for determining whether a key-value pair is indicative of a particular class value. This method is referred to herein as the "threshold method" in order to distinguish it from the method of FIG. 5, which is referred to as the "machine learning method." For each of a plurality of key-value pairs and combinations of key-value pairs in the non-anonymous profiles of the training candidates, the system maintains a count of the number of times the key-value pair or the combination of key-value pairs appears for each of the class values (step 410), and determines whether the key-value pair or the combination (whichever is applicable) is associated with a class value for more than a threshold percentage (e.g., 80%) of candidates in the training set (step 420). If a key-value pair or a combination of key-value pairs is associated with a particular class value for more than the threshold percentage of candidates, the system concludes the key-value pair or the combination of key value-pairs (whichever is applicable) is indicative of the class value and, thus, may influence bias with respect to the defined class (step 430).

Figure 5:
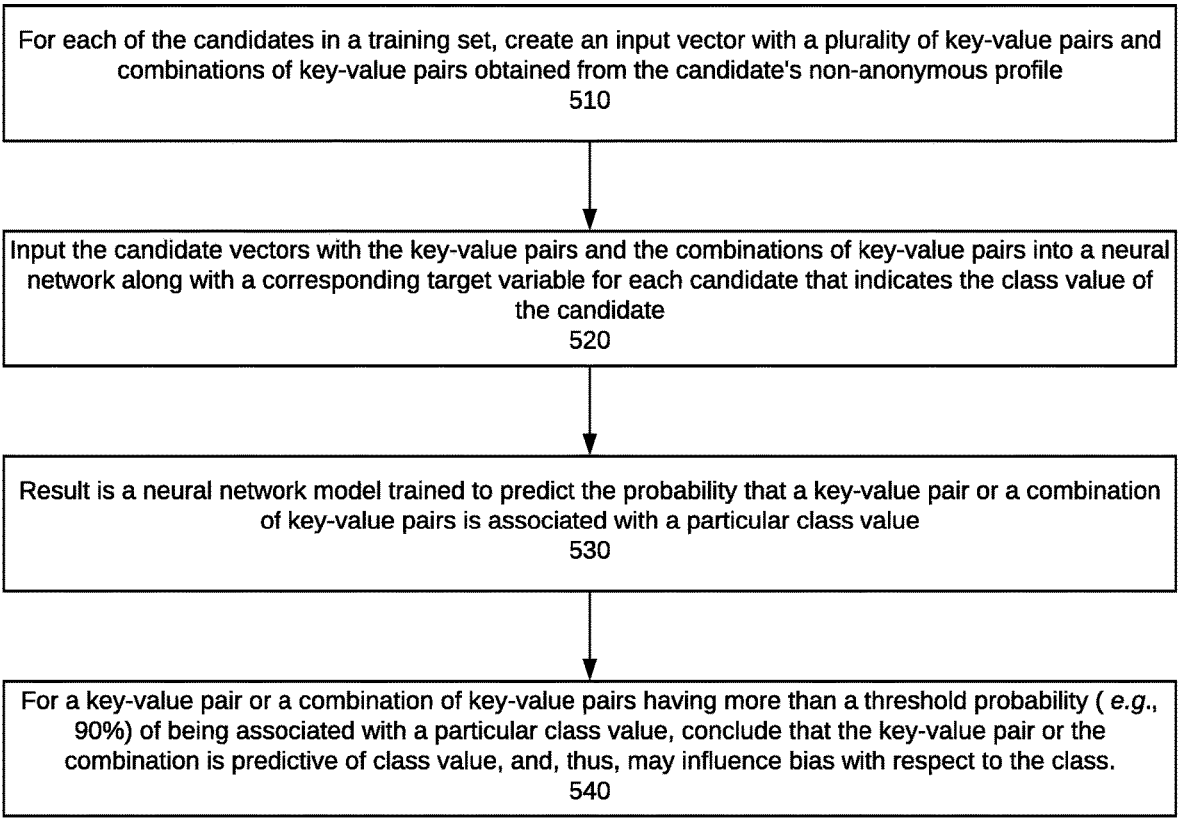
FIG. 5 is a flowchart that illustrates a method, according to an alternate embodiment, for determining whether a key-value pair is indicative of a particular class value.

FIG. 5 illustrates an alternate method for determining whether a key-value pair is indicative of a particular class value. This method uses a neural network, such as a deep neural network, and, as stated above, is referred to herein as the "machine-learning method." For each of the candidates in the training set, the system creates an input vector for the candidate with a plurality of key-value pairs and combination of key-value pairs obtained from the training candidate's non-anonymous profiles (step 510). The input vectors may include all the key-value pairs in the non-anonymous profiles or just a subset of key-value pairs. To train a neural network, the system inputs the vectors for each of the training candidates into the neural network, along with a corresponding target variable for each of the candidates that indicates the class value of the candidate (step 520). The result is a neural network that is trained to predict the probability that a key-value pair or combination of key-value pairs is associated with a particular class value (step 530). For a key-value pair or a combination of key-value pairs having more than a threshold probability (e.g., 90%) of being associated with a particular class value, the system concludes that the key-value pair or the combination of key-value pairs (whichever is applicable) is indicative of class value, and, thus, may influence bias with respect to the class (step 540).

The methods of FIGS. 4 and 5 could be applied to just individual key-value pairs (and not combinations of key-value pairs).

3.2 Example Method for Identifying Key-Value Pairs that May Influence Gender Bias.

Figure 6:
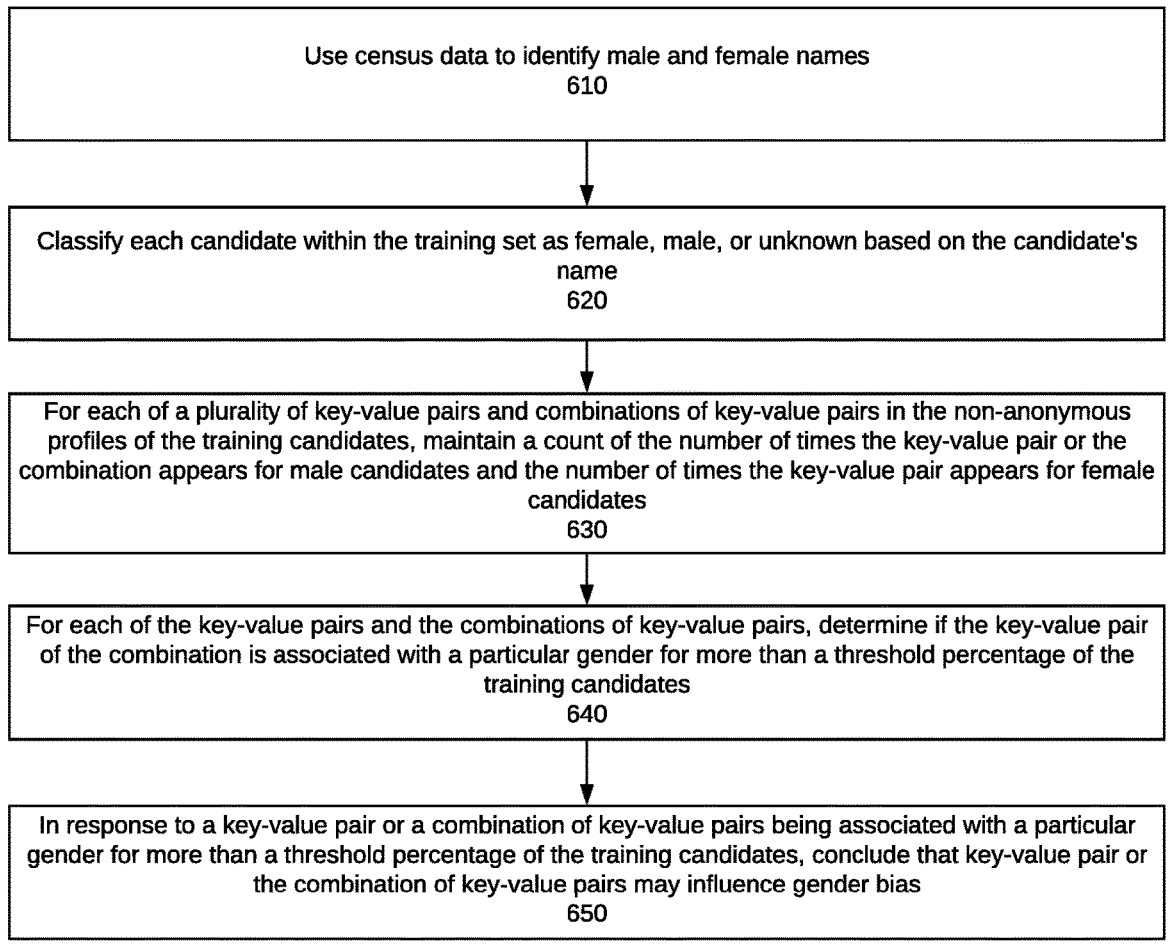
FIG. 6 is a flowchart that illustrates an example method for identifying key-value pairs that may influence gender bias.

FIG. 6 illustrates an example method for identifying key-value pairs that may influence gender bias. This example uses the threshold method described above with respect to FIG. 4, but the machine learning method could be used instead. Census data is inputted or imported into the system, which analyzes the data to identify male and female names (step 610). Specifically, names used for a threshold percentage (e.g., 90%) of one gender are classified as associated with that gender. The system uses this information to classify each candidate in the training set as female, male, or unknown based on the candidate's name (step 620).

For each of a plurality of key-value pairs and combinations of key-value pairs in the non-anonymous profiles of the training candidates, the system maintains a count of the number of times the key-value pair (or the combination) appears for male candidates and the number of times the key-value pair (or the combination) appears for female candidates (step 630), and determines whether the key-value pair or the combination (whichever is applicable) is associated with a particular gender for more than a threshold percentage (e.g., 80%) of candidates in the training set (step 640). If a key-value pair or a combination of key-value pairs is associated with a particular gender for more than the threshold percentage of candidates, the system concludes the key-value pair or the combination of key value-pairs (whichever is applicable) is indicative of the class value and, thus, may influence gender bias (step 650).

3.3 Example Method for Identifying Key-Value Pairs that may Influence Race Bias

Figure 7:
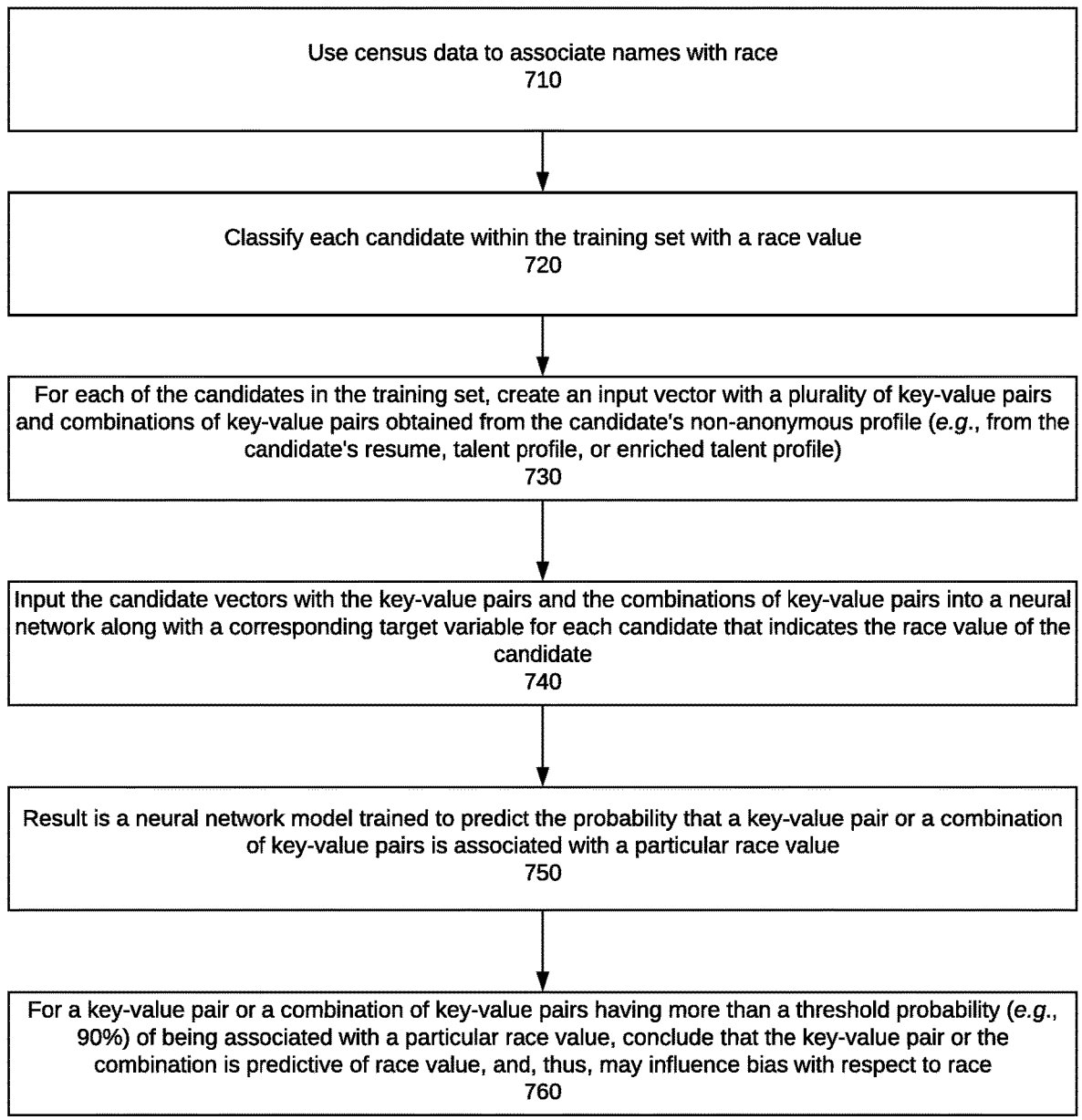
FIG. 7 is a flowchart that illustrates an example method for identifying key-value pairs that may influence race bias.

FIG. 7 illustrates an example method for identifying key-value pairs that may influence race bias. This example uses the machine-learning method described above with respect to FIG. 5, but the threshold method could be used instead. Census data is inputted or imported into the system, which analyzes the data to associate names with races (step 710). Specifically, names used for a threshold percentage (e.g., 90%) of one race are classified as associated with that race value. The system uses this information to classify each candidate in the training set with a race value (which may include "unknown") based on the candidate's name (step 720).

For each of the training candidates, the system creates an input vector for the training candidate with a plurality of key-value pairs and combination of key-value pairs obtained from the training candidate's non-anonymous profile (step 730). To train a neural network, the system inputs the vectors for each of the training candidates into the neural network, along with the candidate's race value (step 740). The result is a neural network that is trained to predict the probability that a key-value pair or a combination of key-value pairs is associated with a particular race value (step 750). For a key-value pair or a combination of key-value pairs having more than a threshold probability (e.g., 90%) of being associated with a particular race value, the system concludes that the key-value pair or the combination of key-value pairs (whichever is applicable) is indicative of race value, and, thus, may influence racial bias (step 760).

3.4 Example Method for Identifying Key-Value Pairs that May Influence Age Bias.

FIG. 8 illustrates an example method for identifying key-value pairs that may influence age bias. This example uses the threshold method described above with respect to FIG. 5, but the machine learning method could be used instead. The system analyzes high school or college graduation dates, and uses these dates to classify each of the candidates in a training set with an age range value (e.g., 20-30 years old, 30-40 years old, etc.) (step 810). For example, in the year 2020, the system may classify someone that graduated from college in the year 2018, with a "20-30-year-old" age range.

For each of a plurality of key-value pairs and combinations of key-value pairs in the non-anonymous profiles of the training candidates, the system maintains a count of the number of times the key-value pair (or the combination) appears for each of the age ranges (step 820), and determines whether the key-value pair or the combination (whichever is applicable) is associated with a particular age range for more than a threshold percentage (e.g., 80%) of candidates in the training set (step 830). If a key-value pair or a combination of key-value pairs is associated with a particular age range for more than the threshold percentage of candidates, the system concludes the key-value pair or the combination of key value-pairs (whichever is applicable) is indicative of age and, thus, may influence age bias (step 840).

4. Further Embodiments—Abstracting Candidate Data to Relevant Levels

In certain embodiments, creating an anonymous profile for candidate also includes removing any data that is not relevant to the job role for which the candidate is applying. The methods describe above with respect to FIGS. 3-8 reduce the likelihood that a reviewer is influenced by a known type of bias, such as gender, race, or age, whereas abstracting candidate profiles to only what is relevant for a job also reduces the likelihood of a reviewer being influenced by reviewer-specific biases that may be unknown to the organization. For example, a particular reviewer may make assumptions about a candidate based on a hobby listed by the candidate, and the candidate's hobbies may not be relevant for obtaining or succeeding at the job for which the candidate is applying.

Figure 9:
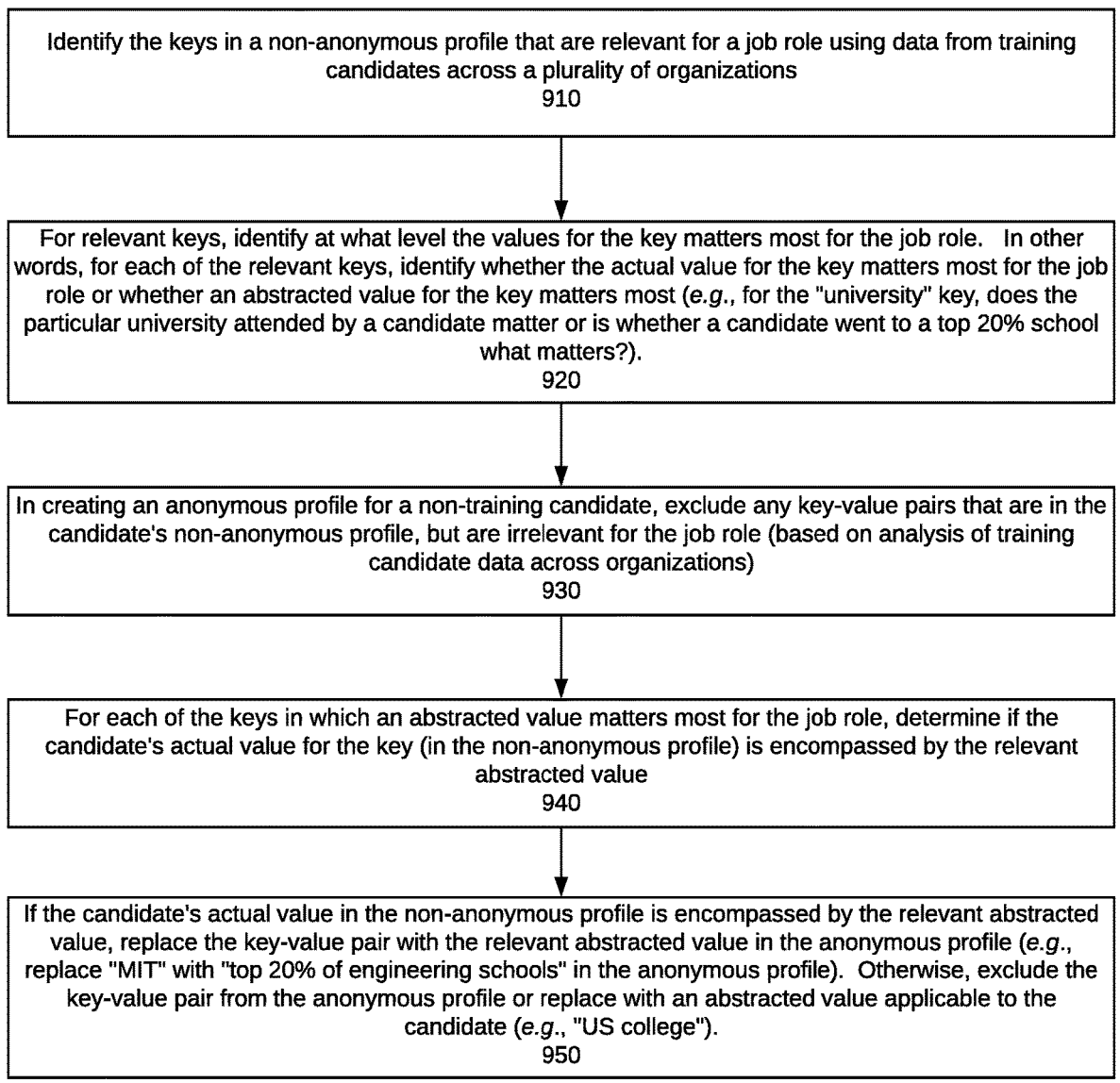
FIG. 9 is a flowchart that illustrates a method, according to one embodiment, for abstracting candidate data to relevant levels for a job role.

FIG. 9 illustrates a method for abstracting candidate data to relevant levels for a job role. The system identifies the keys (i.e., the fields) in a non-anonymous profile that are relevant for a job role using training candidate data, preferably from across a plurality of organizations (step 910). The training candidate data may be obtained from a talent repository maintained by the system or an organization, or from public data sources with employment profile data. Methods for performing this step are described with respect to FIGS. 10-11. If key-value pairs have already been eliminated or substituted in accordance with the method of FIG. 3, then this is performed for the remaining keys in the candidate's non-anonymous profile.

For each of the relevant keys, the system identifies at what level the key matters most for the job role (step 920). In other words, for each of the relevant keys, the system identifies whether the actual value for the key matters most or whether an abstracted value for a key matters most. For example, for the "university" key, does the particular university attended by a candidate matter or is whether a candidate went to a top 20% school (an abstracted value) what matters?

In creating the anonymous profile for the candidate, the system excludes any key-value pairs that are in the non-anonymous profile but are irrelevant for the job role (step 930). For each of the relevant keys in which an abstracted value matters most for the job role, the system determines whether the candidate's actual value for the key is encompassed by the relevant abstracted value (step 940). For example, if what matters most for the "university" key is whether a candidate went to a top 20% school, then system determines whether the university attended by the candidate is a top 20% school. They system may use published or inputted university rankings to make this determination.

If the candidate's actual value in his/her non-anonymous profile is encompassed by the relevant abstracted value, the system replaces the key-value pair in the candidate's non-anonymous profile with the relevant abstracted value in the anonymous profile (step 950). For example, the system may replace "Massachusetts Institute of Technology" in a non-anonymous profile with "top 20% of engineering schools" in the anonymous profile. Otherwise, the system either excludes the key-value pair from the anonymous profile or replaces the key-value pair with an abstracted value relevant to the candidate in the anonymous profile, depending on how the system is configured (also step 950). For example, if the candidate attended a 4-year college that is not ranked in the top 20% of schools (according to the ranking(s) used by the system), then the system may not specify college information for the candidate or the system may replace the candidate's specific college with something like "US university." Key-value pairs that are not abstracted or removed in accordance with step 950 (or other methods described herein) remain in the anonymous profile.

If a candidate applies for multiple job positions at an organization, then the system may create an anonymous profile for the candidate for each of the job roles, as what is relevant for one job role may not be relevant for another job role.

4.1 Identifying Relevant Keys and Abstraction Levels for Key-Value Pairs

Figure 10:
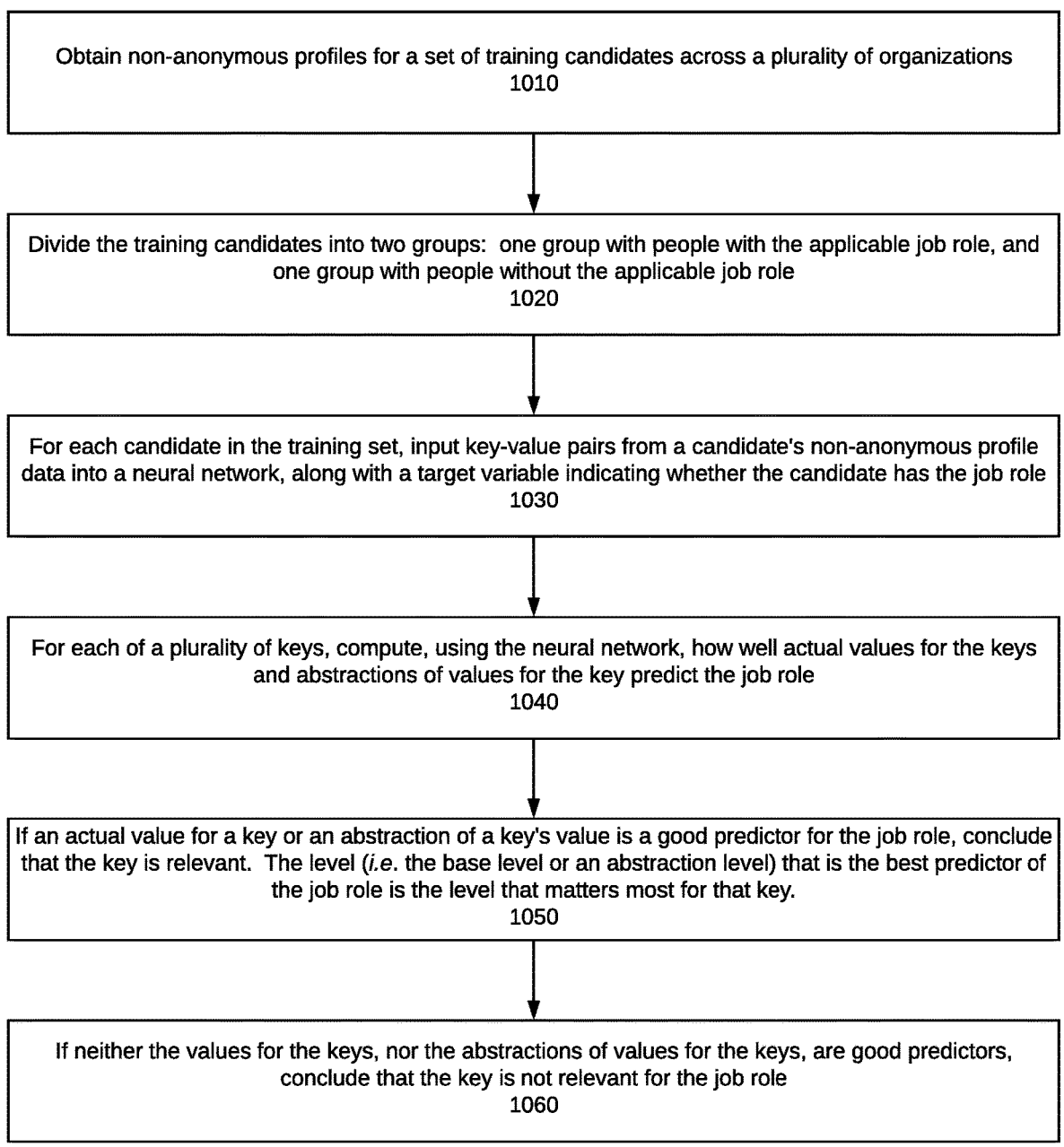
FIG. 10 is a flowchart that illustrates a method, according to one embodiment, for determining what keys in candidate data are relevant for a job role, and, for keys that are relevant, at what level the key matters most.
Figure 11:
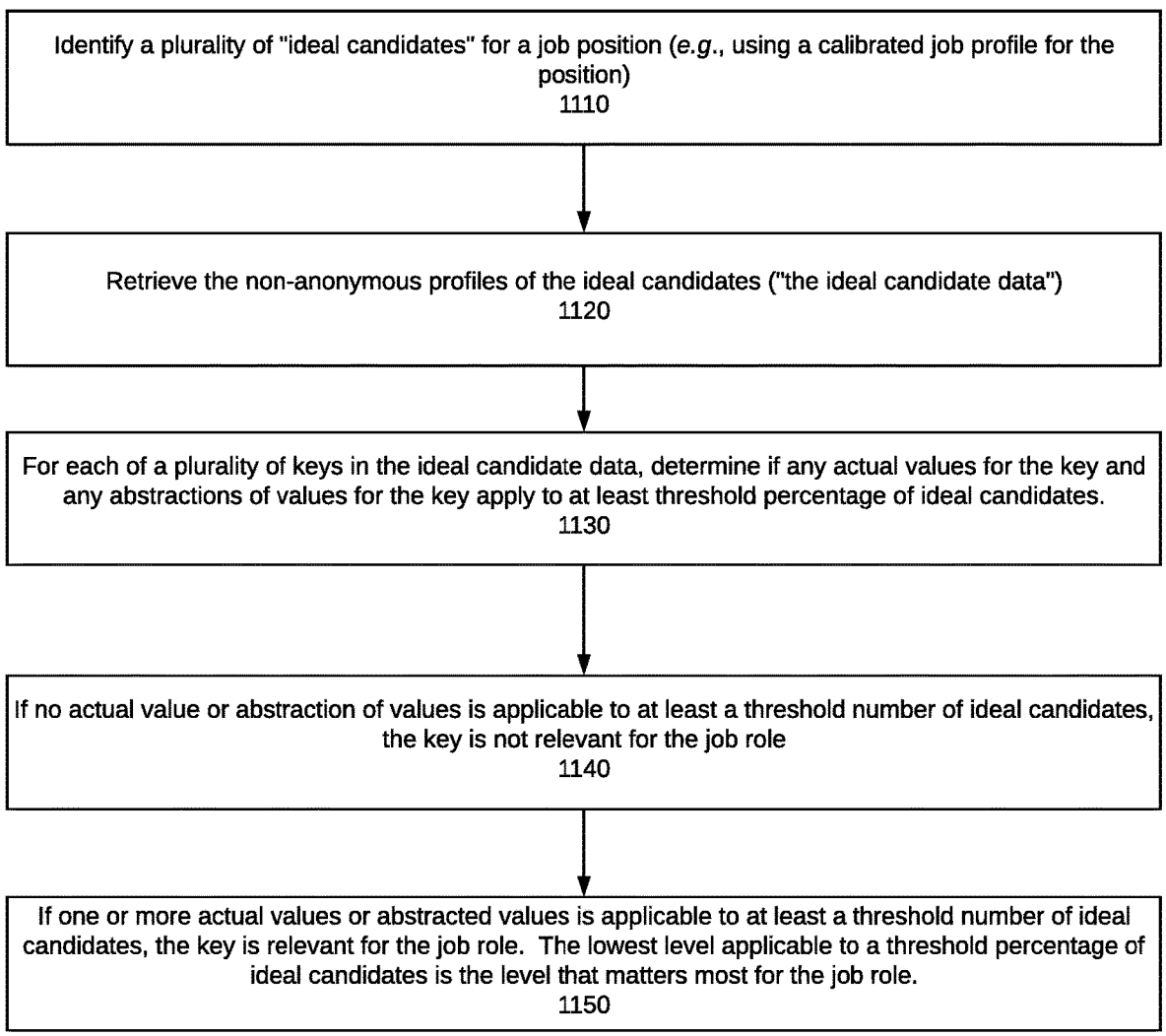
FIG. 11 is a flowchart that illustrates a method, according to an alternate embodiment, for determining what keys in candidate data are relevant for a job role, and, for keys that are relevant, at what level the key matters most.

FIGS. 10 and 11 illustrate two different methods for determining which keys in the non-anonymous profile are relevant for a particular job role and, for keys that are relevant, determining at what level the key matters most (i.e., at the base level or at an abstracted level). FIG. 10 uses a neural network, and FIG. 11 uses data from "ideal candidates" for a job position.

Turning to FIG. 10, the system obtains non-anonymous profiles for a set of training candidates, preferably comprising people from across a plurality of organizations (step 1010). The training set includes both people who have never held the applicable job role and people who currently have or have previously had the applicable job role. The system divides the candidates in the training set into two groups: One group with people who have or have had the applicable job role, and one group with people who have not held the applicable job role (step 1020). For each candidate in the set, the system inputs key-value pairs from the candidate's non-anonymous profile (in the form of an input vector) into a neural network, along with a target variable indicating whether the candidate has (or has had) the job role. In one embodiment, the neural network is a recurring neural network (RNN).

For each of a plurality of keys in the candidate data, the system computes, using the neural network, how well actual values for the keys and abstractions of values for the keys predict the job role (step 1040). The "abstracted values" may be preconfigured by a system administrator or may be determined automatically by clustering values for keys into groups, where a group encompasses multiple values. The system may test multiple abstraction levels for a key.

If an actual value for a key or an abstraction of a key's value is a good predictor for the job role, the system concludes that the key is relevant (step 1050). The level (i.e., the base level or an abstracted level) that is the best predictor of the job role is the level that matters most for the key. For example, for the "undergraduate college" key, if "top 20% school" is a better predictor than a particular university value (e.g., "Stanford"), then "top 20% school," which is an abstracted value, is the level that matters most for that key. Conversely, if for the "skills" key, the value "java" is a better predictor for a job role than an abstracted value that encompasses a wider range of skills, then the base level (i.e., the actual value) for the key is the level that matters most for that key. If neither the actual values for a key, nor abstractions of values for a key, are good predictors, the system concludes that the key is not relevant for the job role (step 1060).

FIG. 11 illustrates an alternate method for identifying the relevant keys and abstraction levels for a job role. The system identifies a plurality of "ideal candidates," across organizations, for a job role, and retrieves non-anonymous profiles for the ideal candidates ("the ideal candidate data") (steps 1110, 1120). In one embodiment, the system obtains ideal candidate data using a calibrated job profile for the job role. Calibrated job profiles are described in U.S. patent application Ser. No. 16/121,401 which is incorporated by reference herein above.

For each of a plurality of keys in the ideal candidate data, the system determines if any actual values for the key and any abstractions of values for the key apply to a least a threshold percentage (e.g., 80%) of ideal candidates (step 1130). If no actual value or abstraction of values is applicable to at least a threshold number of ideal candidates, the system concludes that the key is not relevant for the job role (step 1140). If one or more actual values or abstracted values is applicable to at least a threshold number of ideal candidates, the system concludes that the key is relevant for the job role (step 1150). The lowest level applicable to a threshold percentage of ideal candidates is the level that matters most for the job role. For example, if both an abstracted value for a key and a particular actual value for a key apply to at least a threshold percentage of ideal candidates, the base level (actual value) for the key is the level that matters most for that key.

5. Use of Non-Anonymous Profiles in Ranking Candidates for a Job Position

As stated above, the method may be performed by a computer system that identifies candidates for job positions. In certain embodiments, for each open job position at an organization, the system displays a ranked list of candidates in a user interface for the organization, where the rankings are based on a match score. An example of the matching process is described in U.S. patent application Ser. No. 16/121,401 (incorporated herein above).

In one embodiment, the system calculates the match score and ranks candidates based on the data in the non-anonymous profile (e.g., an enriched talent profile), but, when a user at an organization clicks on a candidate in the ranked list, the system initially displays the anonymous profile for the candidate. The non-anonymous profile used for the ranking may be displayed at a later point if the organization decides to explore the candidate further.

6. General

The methods described herein are embodied in software and performed by a computer system (comprising one or more computing devices) executing the software. A person skilled in the art would understand that a computer system has one or more memory units, disks, or other physical, computer-readable storage media for storing software instructions, as well as one or more processors for executing the software instructions.

As stated an example of a computer system for performing the methods described herein is set forth in U.S. patent application Ser. No. 16/121,401 (incorporated herein above). In addition to the software modules described in U.S. patent application Ser. No. 16/121,401, the system may have a software module for performing the methods described herein.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

The invention claimed is:

1. A method for enabling anonymous application for a job position at an organization, the method comprising: receiving, by one or more hardware processors of a computer system, candidate data of a candidate for the job position; generating, by the one or more hardware processors, a non-anonymous candidate profile based on the candidate data; generating, by the one or more hardware processors, an anonymous profile of the candidate by removing or substituting at least one data item in the non-anonymous candidate profile, wherein generating, by the one or more hardware processors, the anonymous profile of the candidate comprises: identifying data items in the non-anonymous candidate profile, wherein each of the data items is indicative of influence of a defined class of bias including at least one of a gender bias, a race bias, or an age bias, and wherein each of the data items is associated with a key and a value forming a key-value pair; calculating, using a neural network executed by the one or more hardware processors, a probability value of each data item being associated with a class value, wherein the neural network is trained using training data; and responsive to determining that the probability value exceeds a threshold value, removing the corresponding key-value pair or substituting the value of the key-value pair of the corresponding data item using a second value; identifying data items in the non-anonymous profile that are irrelevant for the job position for which the candidate is applying; and excluding the data items that are irrelevant for the job position from the anonymous profile; and presenting the anonymous profile in a user interface while maintaining hidden an identity of the candidate to the organization.

2. The method of claim 1, further comprising:
receiving an indication of a candidate's election to anonymously apply for the job position;
providing, through the user interface, an organization an option to reject or pursue the candidate;

in response to the organization rejecting the candidate, notifying the candidate of the rejection while maintaining hidden the identity of the candidate to the organization; and in response to the organization electing to explore the candidate further, providing the organization a communication link to contact the candidate.

3. The method of claim 1, further comprising:

in response to the organization electing to explore the candidate further, enabling the organization to view the non-anonymous candidate profile at a current time or a later time.

4. The method of claim 1, further comprising: identifying keys in the non-anonymous candidate profile that are relevant for the job position using candidate data across a plurality of organizations; and for each of a plurality of relevant keys in the non-anonymous candidate profile, determining whether an actual value for the key matters most for the job position or whether an abstracted value for the key matters most for the job position, wherein generating the anonymous profile further comprising: excluding key-value pairs from the anonymous profile that correspond to keys identified as irrelevant for the job position; and for a key-value pair corresponding to a relevant key in which an abstracted value for the key matters most for the job position, determining whether the candidate's actual value for the key is encompassed by the abstracted value that matters most and performing the following: in response to the abstracted value encompassing the candidate's actual value for the key, replacing the value in the key-value pair with the abstracted value in the anonymous profile; and in response to the abstracted value not encompassing the candidate's actual value for the key, replacing the value in the key-value pair with a relevant abstracted value for the candidate or excluding the key-value pair from the anonymous profile.

5. The method of claim 4, wherein identifying the keys in the non-anonymous candidate profile that are relevant for the job position comprises:

using the neural network to calculate how well key-value pairs and abstractions of key-value pairs predict a person with the job position across a plurality of organizations.

6. The method of claim 5, wherein a key is considered relevant for the job position in response to a value for the key or an abstraction of values for the key corresponding to a threshold percentage of people identified as ideal candidates.

7. A non-transitory computer-readable medium comprising a computer program, that when executed by one or more hardware processors of a computer system, enables the one or more hardware processors to perform the following operations for enabling anonymous application for a job position at an organization, the operations comprising: receiving, by the one or more hardware processors, candidate data of a candidate for the job position; creating a non-anonymous candidate profile for the candidate based on the candidate data; generating, by the one or more hardware processors, an anonymous profile of the candidate by removing or substituting at least one data item in the non-anonymous candidate profile, wherein generating, by the one or more hardware processors, the anonymous profile of the candidate comprises: identifying data items in the non-anonymous candidate profile, wherein each of the data items is indicative of influence of a defined class of bias including at least one of a gender bias, a race bias, or an age bias, and wherein each of the data items is associated with a key and a value forming a key-value pair; calculating, using a neural network executed by the one or more hardware processors, a probability value of each data item being associated with a class value, wherein the neural network is trained using training data; and responsive to determining that the probability value exceeds a threshold value, removing the corresponding data item or substituting the value of the key-value pair of the corresponding data item using a second value; identifying data items in the non-anonymous profile that are irrelevant for the job position for which the candidate is applying; and excluding the data items that are irrelevant for the job position from the anonymous profile; and presenting the anonymous profile in a user interface while maintaining hidden an identity of the candidate to the organization.

8. The non-transitory computer-readable medium of claim 7, wherein the operations further comprise:

receiving an indication of a candidate's election to anonymously apply for the job position;

providing, through the user interface, an organization an option to reject or pursue the candidate;

in response to the organization rejecting the candidate, notifying the candidate of the rejection while maintaining hidden the identity of the candidate to the organization; and in response to the organization electing to explore the candidate further, providing the organization a communication link to contact the candidate.

9. The non-transitory computer-readable medium of claim 7, wherein the operations further comprise:

in response to the organization electing to explore the candidate further, enabling the organization to view the non-anonymous candidate profile at a current time or a later time.

10. The non-transitory computer-readable medium of claim 7, wherein the operations further comprise: identifying keys in the non-anonymous candidate profile that are relevant for the job position using candidate data across a plurality of organizations; and for each of a plurality of relevant keys in the non-anonymous candidate profile, determining whether an actual value for the key matters most for the job position or whether an abstracted value for the key matters most for the job position, wherein generating the anonymous profile further comprising: excluding key-value pairs from the anonymous profile that correspond to keys identified as irrelevant for the job position; and for a key-value pair corresponding to a relevant key in which an abstracted value for the key matters most for the job position, determining whether the candidate's actual value for the key is encompassed by the abstracted value that matters most and performing the following: in response to the abstracted value encompassing the candidate's actual value for the key, replacing the value in the key-value pair with the abstracted value in the anonymous profile; and in response to the abstracted value not encompassing the candidate's actual value for the key, replacing the value in the key-value pair with a relevant abstracted value for the candidate or excluding the key-value pair from the anonymous profile.

11. The non-transitory computer-readable medium of claim 10, wherein identifying the keys in the non-anonymous candidate profile that are relevant for the job position comprises:

using the neural network to calculate how well key-value pairs and abstractions of key-value pairs predict a person with the job position across a plurality of organizations.

12. The non-transitory computer-readable medium of claim 11, wherein a key is considered relevant for the job position in response to a value for the key or an abstraction of values for the key corresponding to a threshold percentage of people identified as ideal candidates.

13. A computer system for enabling anonymous application for a job position at an organization, the system comprising: one or more memory; and one or more hardware processors to receive candidate data of a candidate for the job position; generate a non-anonymous candidate profile based on the candidate data; generate an anonymous profile of the candidate by removing or substituting at least one data item in the non-anonymous candidate profile, wherein to generate the anonymous profile of the candidate, the one or more hardware processors are further to: identify data items in the non-anonymous candidate profile, wherein each of the data items is indicative of influence of a defined class of bias including at least one of a gender bias, a race bias, or an age bias, and wherein each of the data items is associated with a key and a value forming a key-value pair; calculate, using a neural network executed by the one or more hardware processors, a probability value of each data item being associated with a class value, wherein the neural network is trained using training data; and responsive to determining that the probability value exceeds a threshold value, remove the corresponding key-value pair or substitute the value of the key-value pair of the corresponding data item using a second value; identify data items in the non-anonymous profile that are irrelevant for the job position for which the candidate is applying; and exclude the data items that are irrelevant for the job position from the anonymous profile; and present the anonymous profile in a user interface while maintaining hidden an identity of the candidate to the organization.

14. The system of claim 13, wherein the one or more hardware processors are further to:
receive an indication of a candidate's election to anonymously apply for the job position;
provide, through the user interface, an organization an option to reject or pursue the candidate;
in response to the organization rejecting the candidate, notify the candidate of the rejection while maintaining hidden the identity of the candidate to the organization; and
in response to the organization electing to explore the candidate further, provide the organization a communication link to contact the candidate.

15. The system of claim 13, wherein the one or more hardware processors are further to:
in response to the organization electing to explore the candidate further, enable the organization to view the non-anonymous candidate profile at a current time or a later time.

16. The system of claim 13, wherein the one or more hardware processors are further to: identify keys in the non-anonymous candidate profile that are relevant for the job position using candidate data across a plurality of organizations; and for each of a plurality of relevant keys in the non-anonymous candidate profile, determine whether an actual value for the key matters most for the job position or whether an abstracted value for the key matters most for the job position, wherein to generate the anonymous profile, the one or more hardware processors are further to: exclude key-value pairs from the anonymous profile that correspond to keys identified as irrelevant for the job position; and for a key-value pair corresponding to a relevant key in which an abstracted value for the key matters most for the job position, determine whether the candidate's actual value for the key is encompassed by the abstracted value that matters most and further to: in response to the abstracted value encompassing the candidate's actual value for the key, replace the value in the key-value pair with the abstracted value in the anonymous profile; and in response to the abstracted value not encompassing the candidate's actual value for the key, replace the value in the key-value pair with a relevant abstracted value for the candidate or excluding the key-value pair from the anonymous profile.

17. The system of claim 16, wherein to identify the keys in the non-anonymous candidate profile that are relevant for the job position, the one or more hardware processors are further to:
use the neural network to calculate how well key-value pairs and abstractions of key-value pairs predict a person with the job position across a plurality of organizations.

18. The system of claim 17, wherein a key is considered relevant for the job position in response to a value for the key or an abstraction of values for the key corresponding to a threshold percentage of people identified as ideal candidates.

* * * * *